US012228191B2

(12) United States Patent
Kelly et al.

(10) Patent No.: US 12,228,191 B2
(45) Date of Patent: Feb. 18, 2025

(54) SELECTABLE TORQUE PATH TORQUE CONVERTER ARCHITECTURE

(71) Applicant: Exedy Globalparts Corporation, Belleville, MI (US)

(72) Inventors: Cody Kelly, Ypsilanti, MI (US); Bryant Grytzelius, Canton, MI (US); Kenneth Walega, Northville, MI (US); Scott Binder, South Lyon, MI (US)

(73) Assignee: Exedy GlobalParts Corporation, Belleville, MI (US)

( * ) Notice: Subject to any disclaimer, the term of this patent is extended or adjusted under 35 U.S.C. 154(b) by 173 days.

(21) Appl. No.: 17/902,614

(22) Filed: Sep. 2, 2022

(65) Prior Publication Data

US 2023/0070632 A1    Mar. 9, 2023

Related U.S. Application Data

(60) Provisional application No. 63/315,884, filed on Mar. 2, 2022, provisional application No. 63/240,545, filed on Sep. 3, 2021.

(51) Int. Cl.
*F16H 3/00* (2006.01)
*F16H 45/00* (2006.01)

(52) U.S. Cl.
CPC ....... *F16H 3/006* (2013.01); *F16H 2003/007* (2013.01); *F16H 2045/002* (2013.01); *F16H 2200/0021* (2013.01); *F16H 2200/0034* (2013.01)

(58) Field of Classification Search
CPC .............. F16H 3/006; F16H 2003/007; F16H 2045/002; F16H 2200/0021; F16H 2200/0034

USPC ........................................................ 74/335
See application file for complete search history.

(56) References Cited

U.S. PATENT DOCUMENTS

| | | | | |
|---|---|---|---|---|
| 7,707,910 | B2* | 5/2010 | Klement | F16H 47/06 |
| | | | | 74/331 |
| 9,776,498 | B2* | 10/2017 | Kaltenbach | B60K 6/387 |
| 10,106,149 | B2* | 10/2018 | Zhao | B60W 30/181 |
| 10,471,941 | B2* | 11/2019 | Collins | B60W 10/08 |
| 10,569,639 | B2* | 2/2020 | Choi | F16H 3/006 |
| 10,619,707 | B2* | 4/2020 | Pan | F16H 3/001 |
| 10,723,229 | B1* | 7/2020 | Yao | B60L 7/10 |
| 10,836,372 | B2* | 11/2020 | Meyer | B60W 30/18054 |
| 11,067,050 | B2* | 7/2021 | Shields | F02N 11/0866 |

(Continued)

*Primary Examiner* — Ha Dinh Ho
(74) *Attorney, Agent, or Firm* — Honigman LLP; Eric J. Sosenko; Jonathan P. O'Brien

(57) ABSTRACT

An architecture for coupling the output of a prime mover to a rotationally driven device. The architecture includes a selectable switching device, a terminal output member and a torque transfer device having an intermediate output member. The selectable switching device is coupled to the output of the prime mover and is selectively and alternately coupled between first and second states; in the first state with the torque transfer device, whereby the torque transfer device is rotatably driven by the prime mover and the terminal output member is rotatably driven by the intermediate output member of the torque transfer device; and in the second state with the terminal output member, whereby the terminal output member is rotatably driven by the prime mover and the torque transfer device is rotatably disconnected from the prime mover and is not rotatably driven.

16 Claims, 2 Drawing Sheets

(56) References Cited

U.S. PATENT DOCUMENTS

| | | | |
|---|---|---|---|
| 11,241,968 B2* | 2/2022 | Kava | B60L 50/16 |
| 11,524,675 B2* | 12/2022 | Bryan | B60W 20/50 |
| 11,535,254 B2* | 12/2022 | Magolan | B60L 15/209 |
| 11,572,816 B2* | 2/2023 | Zhang | F02D 29/02 |

* cited by examiner

SELECTABLE TORQUE PATH TORQUE CONVERTER ARCHITECTURE

CROSS REFERENCE TO RELATED APPLICATION

This application is a non-provisional patent application and claims priority to U.S. provisional patent application No. 63/240,545, filed Sep. 9, 2021, and U.S. provisional patent application No. 63/315,884 filed Mar. 2, 2022, the entire contents of which are herein incorporated by reference.

BACKGROUND

1. Field of the Invention

The present invention generally relates to powertrains incorporating a torque converter and, more particularly, to a new architecture for a torque converter, as might be used in the powertrain of a motor vehicle or another device that is to be driven thereby.

2. Description of Related Art

Today, the automotive industry is increasingly moving away from internal combustion engine (ICE) vehicles and toward electric vehicles. While the technology is improving, one drawback of an all-electric vehicle (EV) is the current limitation on battery technology and, resultantly, the mileage range of such vehicles. While drivers who only have short range needs do not consider this an inconvenience, drivers who at least occasionally have mileage needs beyond the range of a typical all-electric vehicle must generally choose between stopping for extended periods of time to recharge the battery or owning a second vehicle that does have an extended driving range.

Even with an ICE vehicle, driving range limitations can be improved by improving the efficiency of the powertrain. One currently employed method includes stopping the ICE, for at least a period of time, when the vehicle is not moving, and restarting the ICE as soon as an intent to move is detected, such as the removal of the driver's foot from the vehicle's brake pedal.

There is also a bridge between these two choices, hybrid vehicles (HV) and plug-in hybrid vehicles (PHEV). Hybrid vehicles alternate between use of a combustion engine and an electric motor to power the vehicle. The net effect being a higher effective gas mileage than a combustion engine vehicle, but lower than an EV. Plug-in hybrid vehicles run on electricity as their primary power source, but will utilize a combustion engine as a backup power source to extend the range of the vehicle.

While the above discusses vehicles and powertrains, powertrains can also be used in other scenarios where a device requires a rotational input. Such other scenarios include, without limitation, the driving of a gear reduction, the subsequent output of which may be coupled to other devices having need for a rotational input.

One component of such powertrains is a torque converter. Torque converters are coupled between the prime mover (ICE, electric motor (EM) or ICE/EM combination) of the powertrain and an output used to rotationally drive the input of the transmission, gear reduction mechanism or other device In a simplistic description, a torque converter may be described as providing a hydrodynamic circuit that is configured to multiply an input torque and transmit the increased torque as an output torque to the input of the transmission, gear reduction mechanism or other device. The torque converter includes a front cover and a rear cover, which together cooperate to define a shell. The shell further defines an internal chamber where the hydrodynamic circuit is provided. Generally, the output of the prime mover causes rotation of the shell, which in turn rotates an impeller within the shell. The impeller directs the hydrodynamic fluid radially outward and then axially forward, toward a turbine. The force imparted on the turbine by the fluid rotationally drives the turbine. From the turbine, the fluid is directed radially inward and subsequently axially back toward the impeller. A stator, positioned between the turbine and the impeller, redirects the fluid so as to efficiently transfer the fluid to the impeller, thereby multiplying the torque being transferred. Because of the hydrodynamic circuit, speed differential (slip) can occur in the torque converter between the input (impeller) and the output (turbine) sides, resulting in torque multiplication.

Having both the ability to multiply torque and speed differential are the purpose and function of the torque converter. Torque multiplication is beneficial when launching a vehicle from a dead stop or towing. However, there are times when it is beneficial to have the ability to lock-up the torque converter, a situation where the front cover (the input of the torque converter) is locked with the output of the torque converter. One such instance is when cruising down the road at a stead state. This lock-up condition is achieved by including a lock-up clutch within the torque converter.

During the lock-up condition, all the components of the torque converter continue to rotate and torque is transferred through the torque converter via the shell/front cover, internal lock-up clutch, output hub and output shaft, but not the hydraulic coupling of the impeller, turbine and stator. While this allows better efficiency than the speed differential the torque converter hydrodynamic circuit allows, inertial inefficiencies in the drivetrain still exist because of the inertia required to rotate the components. These losses occur regardless of the powertrain incorporating an ICE, EM or ICE/EM as the prime mover. Additionally, the maximum rotational speed of the torque converter is a limiting factor for driveline operation at higher rotational speeds.

SUMMARY

In overcoming the enumerated drawbacks and other limitations of the related art, in one aspect the present invention provides an architecture for coupling the output of a prime mover to a device to be driven thereby that is switchable between two different torque paths.

In another aspect, the invention provides an architecture having a selectable switching device, a torque transfer device and a terminal output member. The selectable switching device is configured to be coupled to the output of the prime mover. The selectable switching device is also selectively and alternately coupled in one of a first state and a second state. The torque transfer device includes an input and an intermediate output member, and the intermediate output member is coupled to the terminal output member. In the first state, the selectable switching device couples the output of the prime mover with the torque transfer device, whereby the torque transfer device is rotatably driven by the prime mover and the terminal output member is rotatably driven by the torque transfer device. In the second state, the selectable switching device couples the output of the prime mover with the terminal output member, whereby the terminal output member is rotatably driven by the prime mover and the torque transfer device rotatably disconnected from the prime mover and is not rotatably driven.

In another aspect, the second state the terminal output member is directly driven by the prime mover.

In a further aspect, a second torque transfer device coupled between the prime mover and the terminal output, in the second state the selectable switching device coupling the output of the prime mover with the terminal output member via the second torque transfer device.

In an additional aspect, a synchronizing device coupled between the torque transfer device and the output of the prime mover.

In yet another aspect, the synchronizing device is selectively coupled to the torque transfer device and causes the torque transfer device to rotate at a speed within a predetermined speed differential relative to one of the prime mover and the terminal output member and permits re-engagement of the torque transfer device and the output of the prime mover via the selectable switching device.

In still a further aspect, the synchronizing device permits re-engagement of the torque transfer device and the output of the prime mover via the selectable switching device over an operational range and during operational conditions where torque multiplication or converter slip are desired.

In an additional aspect, the synchronizing device and the selectable switching device are integrated in a common device.

In yet another aspect, a synchronizing device coupled between the torque transfer device and the terminal output member In a further aspect, the device to be driven is a transmission of a vehicle.

In another aspect, the invention provides, an architecture for coupling the output member of a prime mover to device to be driven thereby, the architecture including an input member configured to be coupled to the output member of the prime mover, a torque transfer device, a terminal output member configured to be coupled to the device to be driven and a selectable switching device coupled between the input member, the torque transfer device and the terminal output member. The selectable switching device is engageable in a first state where the input member is rotatably connected to the torque transfer device and the torque transfer device rotatably drives the output member in rotation; and in a second state where the input member is rotatably connected to the terminal output member and the input member drives the terminal output member in rotation. In the second state, the input member is rotatably disconnected from the torque transfer device whereby the torque transfer device is not rotatably driven by the input member.

In still another aspect, in the second state the terminal output member is directly driven by the prime mover.

In a further aspect, a second torque transfer device is coupled between the prime mover and the terminal output, and in the second state the selectable switching device coupling the output of the prime mover with the terminal output member via the second torque transfer device.

In an additional aspect, a synchronizing device is coupled between the torque transfer device and one of the output of the prime mover and the terminal output member.

In yet another aspect, the synchronizing device is selectively coupled to the torque transfer device and causes the torque transfer device to rotate at a speed within a predetermined speed differential relative to one of the prime mover and the terminal output member and permits re-engagement of the torque transfer device and the output of the prime mover via the selectable switching device over an operational range and the during operational conditions where torque multiplication or converter slip are desired.

In still a further aspect, the synchronizing device and the selectable switching device are integrated in a common device.

Further objects, features and advantages of this invention will become readily apparent to persons skilled in the art after review of the following description, including the claims, and with reference to the drawings that are appended to and form a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part, whether or not such an axis is designated in the figures. An axial surface is therefore one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Figure 1:
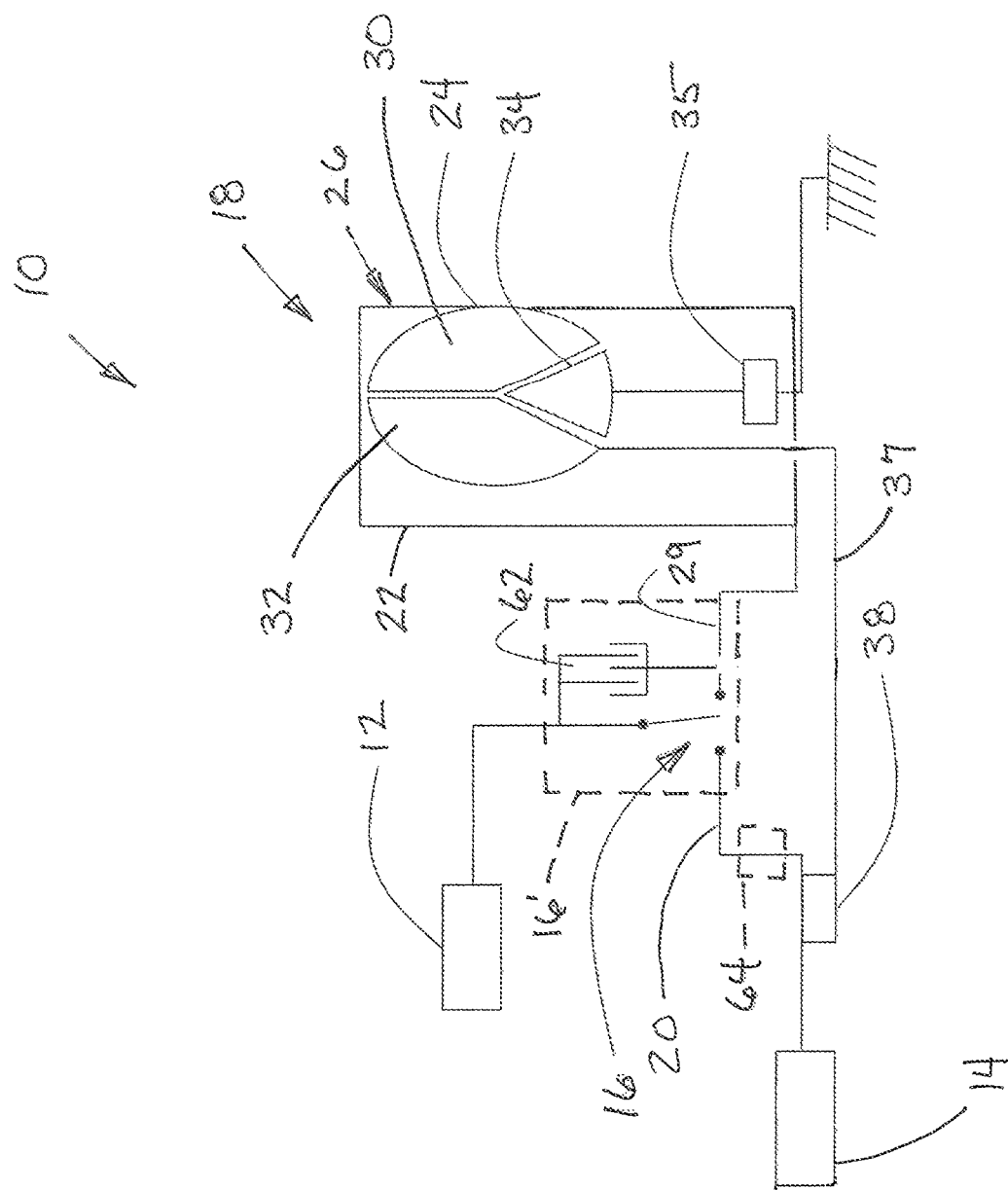
FIG. 1 is schematic illustration of a torque converter architecture embodying the principles of the present invention.
Figure 2:
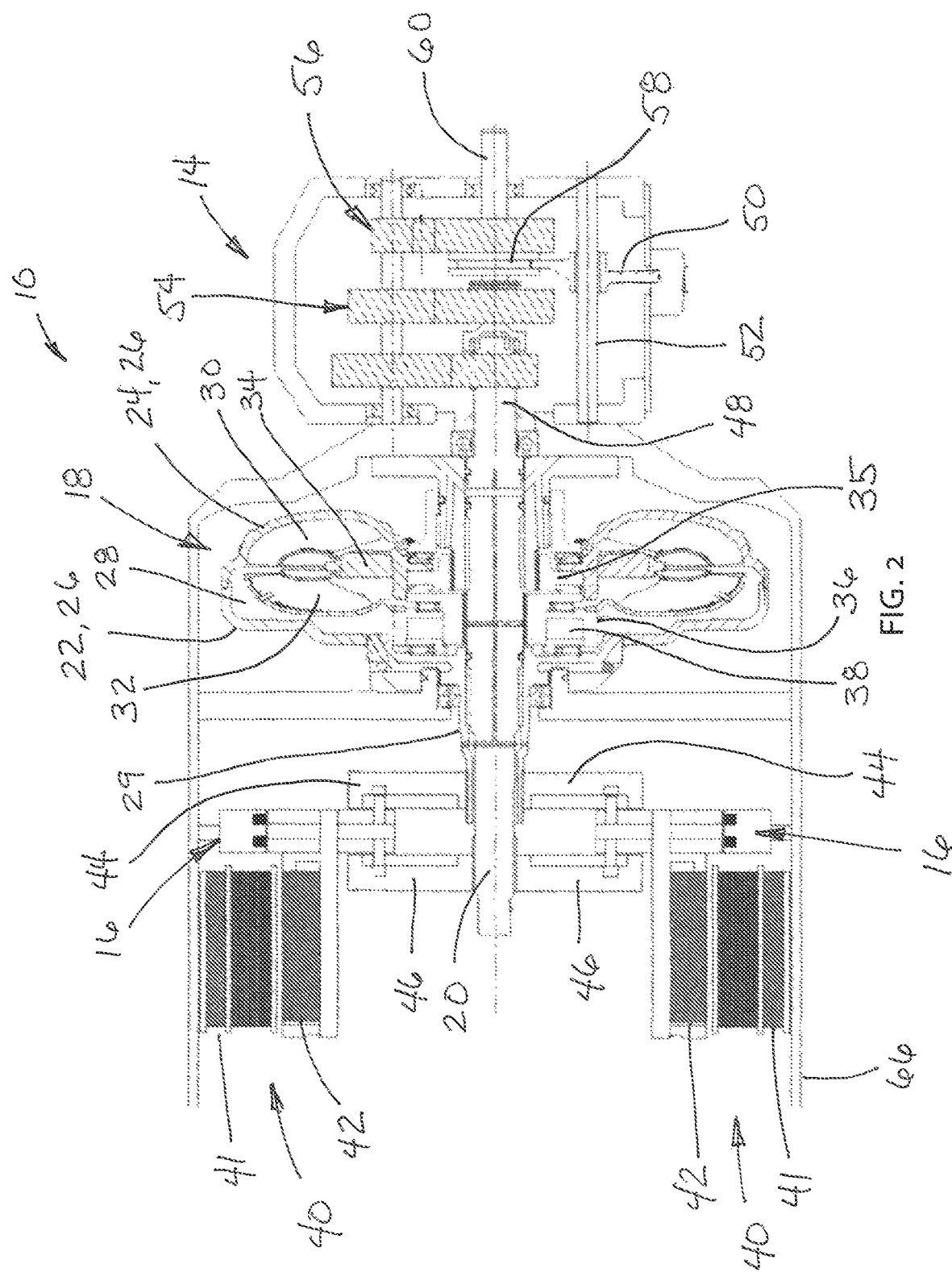
FIG. 2 is a schematic cross-sectional view of one implementation of the torque converter architecture seen in FIG. 1.

Referring now to the drawings, a torque converter architecture embodying the principles of the present invention is generally illustrated in FIG. 1 and designated at 10. The torque converter architecture 10 is positioned between the prime mover 12 and the input of a subsequent/downstream drivetrain element, gear reduction mechanism or other device 14, one of which is seen in FIG. 2. The prime mover 10 may be an internal combustion engine (ICE) and electric motor (EM) or combination of the two (ICE/EM).

As its general components, the torque converter architecture 10 includes a selectable switching device 16, a torque converter 18 and an output 20, such as an output shaft. During operation, torque from the prime mover 12 is transferred to the selectable switching device 16. Depending on the state of the selectable switching device 16, the torque from the prime mover 12 may be directed to the torque converter 18 and then the output 20 (a first operational state) or directly to the output 20 (as second operational state). When a direct drive condition is desired between the output of the prime mover 12 and the input of the downstream device 14, the selectable switching device 16 passes torque directly to the output 20. In this second operational state, the torque converter 18 is completely bypassed and no rotational input is provided to the torque converter 18.

The torque converter 18 provides a hydrodynamic circuit that is configured to multiply an input torque and transmit the increased torque as an output torque to the driven downstream device 14. The torque converter 18 includes a front cover 22 and a rear cover 24, which together cooperate to define a shell 26. The shell 26 further defines an internal chamber 28 where the hydrodynamic circuit is provided.

An input shaft 29 transmits torque to the torque converter 18, which is received by the shell 26, typically at the front cover 22, and transferred to an impeller 30, which is typically attached internally to the rear cover 24. The impeller 30 directs the hydrodynamic fluid radially outward and then axially forward, toward a turbine 32. The force imparted on the turbine 32 by the fluid rotationally drives the turbine 32. From the turbine 32, the fluid is directed radially inward and subsequently axially back toward the impeller 30. A stator 34, positioned between the turbine 32 and the impeller 30 and supported by a one-way clutch 35, redirects the fluid so as to efficiently transfer the fluid to the impeller 30, thereby multiplying the torque being transferred.

The turbine 32 is connected to a turbine output hub 36, and the turbine output hub 36 transfers the output torque by way of an intermediate output member 37 and a one-way clutch 38 to the output member 20, which transmits the torque to the downstream device 14. As an alternate to the one-way clutch 38, a clutch/selectable device may be used. A damper assembly, not shown, may also be provided in the torque converter 18 for NVH isolation before transfer of the output torque to the output member 20.

As previously mentioned, typically, a lock-up clutch assembly comprised of a piston/clutch assembly is provided within a torque converter to allow the torque converter to lock the input from its front cover with the turbine output hub. Locked-up in this manner, torque being transmitted to the downstream device bypasses the hydrodynamic circuit of the impeller and turbine. However, the front and rear covers, impeller, turbine, stator, damper and other components of the torque converter are still rotating, along with the associated inertia and efficiency losses.

With the present torque converter architecture 18, a lock-up clutch is omitted from the torque converter 18 in favor of the upstream selectable switching device 16. Thus, in addition to avoiding losses due to rotation of the torque converter during a lock-up condition, the torque converter's overall mass is reduced and a high pressure hydraulic circuit, for operating the lock-up clutch, is removed.

The architecture 10 embodying the principles of the present invention may be implemented in other constructions utilizing torque transfer devices other than torque converters. For example, another device, such as a fluid coupling device, hydrostatic coupling device or other device that transmits torque, could be used in place of the torque converter 18.

For the selectable switching device 16, it will be appreciated that various types of selectable clutches/devices may be employed. Illustratively, such devices include, without limitation, hydraulic clutches, synchronizers, and selectable electric clutches. As described, such devices must be of a type that when implemented allow the torque transferred from the selectable switching device 16 to be alternately directed to the input shaft 29 of the torque converter 18 or directly to the output member 20.

While schematically illustrated in FIG. 1, seen in FIG. 2 is modified physical implementation of the torque converter architecture 10. As seen therein, the prime mover 12 is represented by a torque generator, namely an electric motor (EM) 40 having a fixed stator 41 and rotatable rotor 42. (While shown as an EM, the prime mover 12 could alternatively be shown as an internal combustion engine (ICE) or a combination of both.) When torque is provided via the rotor 42 of the EM 40, torque is transferred to the selectable switching device 16. Depending on the state of the selectable switching device 16, torque is transferred to one of two output drive members 44, 46 and, respectively, to either the input shaft 29 of the torque converter 18 or to output member 20, but not simultaneously to both. As seen in FIG. 2, the output member 20 is provided as an output shaft and is concentrically located within the input shaft 29. The output member 20 and input shaft 29 are supported for independent rotation relative to one another by bearings or other means.

When directing torque to the torque converter 18, torque is transferred from the selectable switching device 16 to the input shaft 29, which is fixedly coupled to the front cover 22 of the torque converter's shell 26 and rotationally drives the rear cover 24. As discussed above, the fluid coupling between the impeller 30 (which is carried by the rear cover 24) and turbine 32 drives the turbine 32 and the stator 34 efficiently reverts the hydraulic fluid back to the impeller, whereby torque is multiplied and transferred back to the turbine 32. The turbine 32 again includes a turbine output hub 36 that is coupled via the one-way clutch 38 to the output member 20 and drives the output shaft 20 in the first state of the selectable switching device 16.

As seen in FIG. 2, the output member 20 is also the input shaft 46 of the downstream device 14, which is shown as a gearbox or transmission 48. The gearbox 48 includes a shift fork 50 axially riding on a shift rail 52 to couple the input shaft 48 to either forward drive gear set 54 or a rearward drive gear set 56, via a synchronizer 58, thereby providing both forward and rearward operation of the gearbox 48. Provided in this manner, when torque is directed through the through the torque converter 18, it will be appreciated that torque multiplication can be employed during both forward and rearward operation and outputted via output shaft 60 to a further driven device or component (not shown). It will further be appreciated that various types of engaging/switching mechanisms between the forward and reverse could be employed in place of that described above.

When directing torque and bypassing the torque converter 18, torque is transferred from the selectable switching device 16 directly to the output member 20 via output drive 46. The output member 20 thereafter directly operates as the input shaft 48 of the downstream device 14/gearbox 48 as described above, absent of torque multiplication.

In an alternative construction of the architecture, a second torque transfer device 64 may be implemented between the selectable switching device 16 and the output member 20 when the selectable switching device 16 is in the second state. The second torque transfer device 64 is preferably of a different variety of torque transfer device than the torque converter 18 and, for example, may be a slip clutch or a peak torque limiter or other device.

With the prime mover 12 (shown as EM 40 in FIG. 2) directly driving the output member 20, the torque converter 18 is not driven, maximizing efficiency, and may actually cease to rotate. To enable reconnecting of the non-driven torque converter 18 with the prime mover 12 over the operating speed range of the system, optionally, a synchronizing device 62 may be employed. The synchronizing device 62 is seen in the schematic drawing of FIG. 1.

The synchronizing device 62 brings the input shaft 29, shell 26 and impeller 30 of torque converter 18 up to a speed, which is within a specific speed differential range, relative to the rotation of output member of the prime mover 12, thereby allowing the selectable switching device 16 to be readily re-engaged for transmitting torque through the torque converter 18. Alternatively, the synchronizing device 62 may bring the input shaft 29 up to a speed, within the specific speed differential range, relative to the rotation of the output member 20.

The synchronizing device 62 may be provided in the form of a hydraulic clutch, an electric clutch, an e-motor, or other device (manual or automatic). A clutch device is schematically shown in FIG. 1 as the synchronizing device 62), but is not limited thereto. In another alternate construction, the synchronizing device 62 may be combined and/or integrated into a single device 16' with the selectable switching device 16.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:

1. An architecture for coupling an output of a prime mover to a device to be driven thereby, the architecture comprising:
    a selectable switching device configured to be coupled to the output of the prime mover, the selectable switching device also being selectively and alternately coupled in one of a first state and a second state;
    a torque transfer device, the torque transfer device having an input and an intermediate output member and being located downstream of the selectable switching device;
    a terminal output member, the intermediate output member being coupled to the terminal output member;
    in the first state the selectable switching device coupling the output of the prime mover with the torque transfer device, whereby the torque transfer device is rotatably driven by the prime mover and the terminal output member is rotatably driven by the torque transfer device; and
    in the second state the selectable switching device coupling the output of the prime mover with the terminal output member, whereby the terminal output member is rotatably driven by the prime mover and the torque transfer device rotatably disconnected from the prime mover and is not rotatably driven.

2. The architecture according to claim 1, wherein in the second state the terminal output member is directly driven by the prime mover.

3. The architecture according to claim 1, further comprising a second torque transfer device coupled between the prime mover and the terminal output member, in the second state the selectable switching device coupling the output of the prime mover with the terminal output member via the second torque transfer device.

4. The architecture according to claim 1, further comprising a synchronizing device coupled between the torque transfer device and the terminal output member.

5. The architecture according to claim 4, wherein the device to be driven is a transmission of a vehicle.

6. An architecture for coupling an output of a prime mover to a device to be driven thereby, the architecture comprising:
    a selectable switching device configured to be coupled to the output of the prime mover, the selectable switching device also being selectively and alternately coupled in one of a first state and a second state;
    a torque transfer device, the torque transfer device having an input and an intermediate output member;
    a terminal output member, the intermediate output member being coupled to the terminal output member;
    a synchronizing device coupled between the torque transfer device and the output of the prime mover; and
    in the first state the selectable switching device coupling the output of the prime mover with the torque transfer device, whereby the torque transfer device is rotatably driven by the prime mover and the terminal output member is rotatably driven by the torque transfer device;
    in the second state the selectable switching device coupling the output of the prime mover with the terminal output member, whereby the terminal output member is rotatably driven by the prime mover and the torque transfer device rotatably disconnected from the prime mover and is not rotatably driven.

7. The architecture according to claim 6, wherein the synchronizing device is selectively coupled to the torque transfer device and causes the torque transfer device to rotate at a speed within a predetermined speed differential relative to one of the prime mover and the terminal output member and permits re-engagement of the torque transfer device and the output of the prime mover via the selectable switching device.

8. The architecture according to claim 6, wherein the synchronizing device permits re-engagement of the torque transfer device and the output of the prime mover via the selectable switching device over an operational range and during operational conditions where torque multiplication or converter slip are desired.

9. The architecture according to claim 6, wherein the synchronizing device and the selectable switching device are integrated in a common device.

10. An architecture for coupling an output member of a prime mover to device to be driven thereby, the architecture comprising:
    an input member configured to be coupled to the output member of the prime mover;
    a torque transfer device;
    a terminal output member, the terminal output member configured to be coupled to the device to be driven;
    a selectable switching device coupled between the input member and the torque transfer device and between the input member and the terminal output member;
    the selectable switching device being engageable in a first state wherein the input member is rotatably connected to the torque transfer device and the torque transfer device rotatably drives the terminal output member in rotation; and
    the selectable switching device being engageable in a second state wherein the input member is rotatably connected to the terminal output member and the input member drives the terminal output member in rotation, in the second state the input member being rotatably disconnected from the torque transfer device whereby the torque transfer device is not rotatably driven by the input member.

11. The architecture according to claim 10, wherein in the second state the terminal output member is directly driven by the prime mover.

12. The architecture according to claim 10, further comprising a second torque transfer device coupled between the prime mover and the terminal output member, in the second state the selectable switching device coupling the output of the prime mover with the terminal output member via the second torque transfer device.

13. The architecture according to claim 10, further comprising a synchronizing device coupled between the torque transfer device and one of the output of the prime mover and the terminal output member.

14. The architecture according to claim 13, wherein the synchronizing device is selectively coupled to the torque transfer device and causes the torque transfer device to rotate at a speed within a predetermined speed differential relative to one of the prime mover and the terminal output member and permits re-engagement of the torque transfer device and the output of the prime mover via the selectable switching device over an operational range and during operational conditions where torque multiplication or converter slip are desired.

15. The architecture according to claim 14, wherein the synchronizing device and the selectable switching device are integrated in a common device.

16. The architecture according to claim 10, wherein the device to be driven is a transmission of a vehicle.

\* \* \* \* \*